US011981050B2

(12) United States Patent
Slavinski et al.

(10) Patent No.: US 11,981,050 B2
(45) Date of Patent: May 14, 2024

(54) METHOD AND SYSTEM FOR CRACKING A FLEXIBLE MOLD OF DRIED WET-CAST CONCRETE PRODUCTS

(71) Applicants: Slab Innovation Inc., Saint-Hubert (CA); Les Pierres Royales, Varennes (CA)

(72) Inventors: Benoit Slavinski, St-Basile-Le-Grand (CA); Maxime Chevrier, St-Michel (CA); Ludovic Legendre, Montreal (CA); Dominique Vézina, Carignan (CA)

(73) Assignees: Slab Innovation Inc., St-Hubert (CA); Les Pierres Royales, Varennes (CA)

( * ) Notice: Subject to any disclaimer, the term of this patent is extended or adjusted under 35 U.S.C. 154(b) by 165 days.

(21) Appl. No.: 16/794,396

(22) Filed: Feb. 19, 2020

(65) Prior Publication Data

US 2021/0252739 A1 Aug. 19, 2021

(51) Int. Cl.
*B28B 13/06* (2006.01)
*B28B 7/06* (2006.01)

(52) U.S. Cl.
CPC .............. *B28B 13/062* (2013.01); *B28B 7/06* (2013.01)

(58) Field of Classification Search
CPC ....... B28B 13/04; B28B 13/06; B28B 13/062; B28B 7/06; B28B 7/24; B28B 5/02
USPC ............................ 425/436 R, 440, 441, 444
See application file for complete search history.

(56) References Cited

U.S. PATENT DOCUMENTS 5,147,027 A * 9/1992 Cruver ................. B65G 47/084 198/419.3
5,783,135 A * 7/1998 Smith ........................ B28B 7/06 264/313
7,841,852 B2 * 11/2010 Verhoff ................... B28B 13/06 425/436 RM
8,911,224 B2 * 12/2014 Correia ................. B28B 13/062 249/127
8,969,623 B2 * 3/2015 Mathad ................. C07C 251/30 564/377

(Continued)

FOREIGN PATENT DOCUMENTS

JP 09085726 A * 3/1997
JP H0957731 A * 3/1997 ............. B28B 13/06

(Continued)

OTHER PUBLICATIONS

Machine Englsih translation of Shibata (JPH0957731A), "Method for Releasing Cement Construction Material From Mold"; (1997); Retrieved from https://worldwide.espacenet.com/patent/search/family/016695442/publication/JPH0957731A?q=pn%3DJP3373703B2 (Year: 1997).*

(Continued)

*Primary Examiner* — Jeffrey M Wollschlager
*Assistant Examiner* — Edgaredmanuel Troche
(74) *Attorney, Agent, or Firm* — Agence de Brevets Fournier

(57) ABSTRACT

The problem of wet-cast concrete products getting stuck in a flexible mold during demolding is solved, prior to demolding the wet-cast concrete products, by removing a vacuum on the flexible mold by moving at least one side edge of the flexible mold away from a part of the flexible mold that is adjacent to the at least one side edge in a direction opposite the open side of the flexible mold.

9 Claims, 6 Drawing Sheets

(56) References Cited

U.S. PATENT DOCUMENTS

2007/0228613 A1* 10/2007 Plourde ..................... B28C 9/00
425/436 RM
2008/0150196 A1* 6/2008 Van Cauwenbergh ......................
B28B 13/062
264/334
2009/0311356 A1* 12/2009 Belt ...................... B28B 13/025
425/120
2018/0111289 A1* 4/2018 Savorelli ............... B28B 13/062

FOREIGN PATENT DOCUMENTS

SU 1016171 A * 5/1983 ............... B28B 7/06
ZA 2011/01114 B 2/2011

OTHER PUBLICATIONS https://www.youtube.com/watch?v=Chjr9SLwkUM.

* cited by examiner

METHOD AND SYSTEM FOR CRACKING A FLEXIBLE MOLD OF DRIED WET-CAST CONCRETE PRODUCTS

FIELD

The present disclosure concerns concrete molded product manufacturing. More specifically, the present disclosure is concerned with a method and system for cracking a flexible mold of dried wet-cast concrete products.

BACKGROUND

Precast concrete is a well-known construction product produced by casting concrete in a reusable mold or "form", which is then cured in a controlled environment. There are mainly two common methods of manufacturing precast concrete products: the dry-cast method and the wet-cast method. Both methods create a simulated natural cut stone look and are used in manufacturing a variety of products such as: paving stones, bricks, veneer bricks, retaining wall bricks, steppingstones, etc.

As its name would imply, wet-cast concrete is more liquid. It has a high slump, which gives it the ability to be poured from a mixer or hopper. Also, in wet-cast a rubber mold is used. In contrast, dry-cast concrete is very dry, has zero or near-zero slump, and the forms can be stripped as soon as the concrete has been consolidated.

The dry cast manufacturing process typically involves complex machinery. Dry-cast concrete contains only enough water to hydrate the cement. The mix is compressed in a mold with very high pressure and then cured on a rack before being palletized and processed.

To manufacture wet-cast products, concrete is poured into a flexible mold and then vibrated to release air bubbles out of the mix. The mold then gets stripped after the concrete has cured.

De-molding in wet-cast is usually done by raising the mold, face-down, from a table or conveyor, or by peeling the mold.

While such de-molding process works fine with sufficiently large and heavy products, which simply stays on the table while the mold is removed, it has been found that smaller products get stuck in the mold.

This is caused by the concrete actually creating a vacuum on the mold, resulting in a tight connection between the products and the mold.

It results that current demolding of wet-cast concrete products, especially of relatively small products, cannot be automated and requires extra labor.

A demolding method and system that is free of the above drawback is therefore desirable.

SUMMARY

The problem of wet-cast concrete products getting stuck in a flexible mold during demolding is solved, prior to demolding the concrete products, by removing a vacuum on the flexible mold by moving at least one side edge of the flexible mold away from a part of the flexible mold that is adjacent to the at least one side.

The action of removing the vacuum on a flexible mold having dried wet-cast concrete products therein will be referred to in the description and in the claims as 'cracking'.

According to an illustrative embodiment, there is provided a method comprising:

providing at least one flexible mold that is at least partially filled with dried wet-cast concrete products; each of the at least one flexible mold having a peripheral edge; and removing a vacuum on the at least one flexible mold by moving at least one portion of the peripheral edge away from another portion of the flexible mold that is adjacent to the at least one portion of the peripheral edge.

According to another illustrative embodiment, there is provided a system for cracking at least one flexible mold of dried wet-cast concrete products, the system comprising:

- a table defining a surface for receiving the at least one flexible mold thereon; and
- at least one mold-bending member that is mounted to the table so as to be movable towards and away a mold-contacting position that forces an edge portion of the at least one flexible mold to move away from the surface.

According to still another embodiment, there is provided a system for cracking at least one flexible mold of dried wet-cast concrete products, the system comprising:

- a table defining a surface for receiving the at least one flexible mold thereon;
- at least one mold-bending member that is mounted to the table under the surface so as to be movable towards and away a mold-contacting position that forces an edge portion of the at least one flexible mold to move away from the surface; the table including at least one opening, each registered with a corresponding one of the at least one mold-bending member; the at least one mold-bending member extending at least partially out of the at least one opening when the at least one mold-bending member is in the mold-contacting position; and
- at least one mold-support member mounted to the table for movement between a first position away the surface and a second position adjacent the surface that maintains onto the surface a portion of the at least one flexible mold that is adjacent the edge portion when the at least one mold-bending member is in the mold-contacting position.

Other objects, advantages and features of embodiments of a method and system for cracking a flexible mold of dried wet-cast concrete products will become more apparent upon reading the following non-restrictive description of preferred embodiments thereof, given by way of example only with reference to the accompanying drawings.

DETAILED DESCRIPTION

Figure 1:
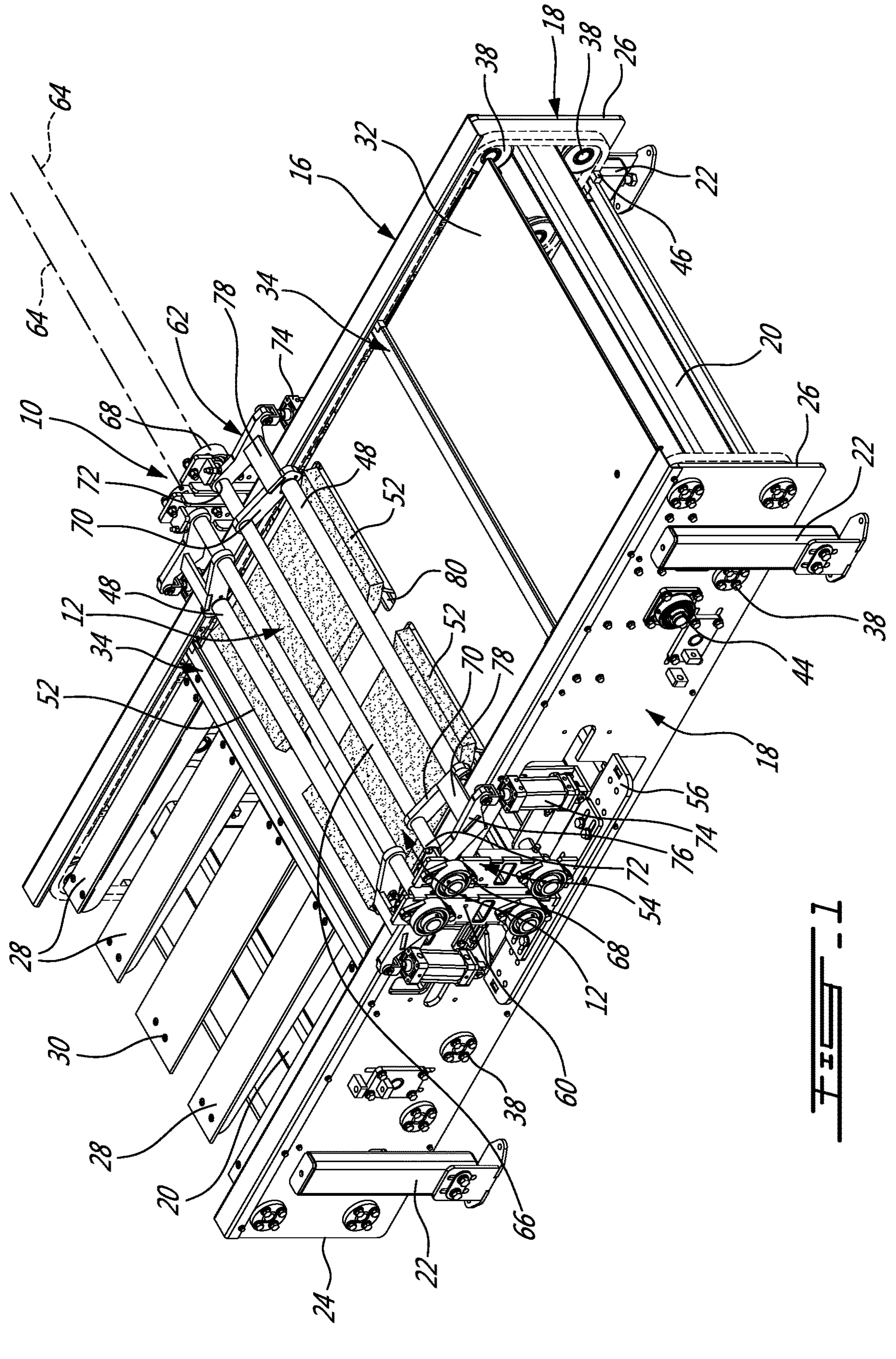
FIG. 1 is a top perspective of a system for cracking a flexible mold of dried wet-cast concrete products according to an illustrative embodiment.
Figure 2:
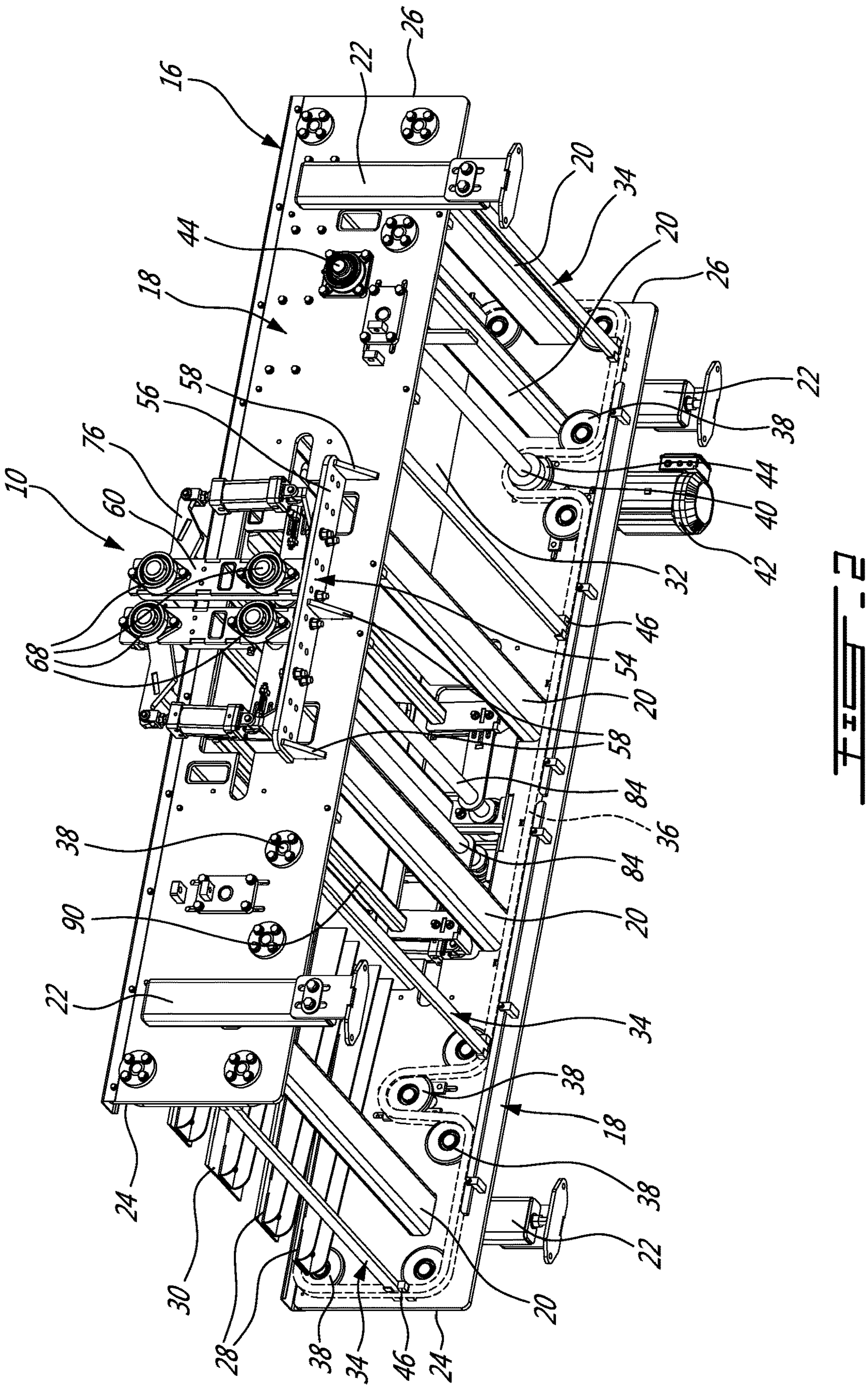
FIG. 2 is a bottom perspective of the system from FIG. 1.

In the following description, similar features in the drawings have been given similar reference numerals, and in order not to weigh down the figures, some elements are not referred to in some figures if they were already identified in a precedent figure.

The use of the word “a” or “an” when used in conjunction with the term “comprising” in the claims and/or the specification may mean “one”, but it is also consistent with the meaning of “one or more”, “at least one”, and “one or more than one”. Similarly, the word “another” may mean at least a second or more.

As used in this specification and claim(s), the words “comprising” (and any form of comprising, such as “comprise” and “comprises”), “having” (and any form of having, such as “have” and “has”), “including” (and any form of including, such as “include” and “includes”) or “containing” (and any form of containing, such as “contain” and “contains”), are inclusive or open-ended and do not exclude additional, un-recited elements.

A system 10 for cracking flexible molds 12 of dried wet-cast concrete products 14 according to an illustrative embodiment will now be described with reference to FIGS. 1, 2 and 3A-3B. As can be seen in FIG. 1, the system 10 is configured to simultaneously crack two (2) molds 12 at the same time. As can become more apparent upon reading the following description, the system 10 can be adapted to simultaneously receive and crack any number of molds 12.

Figure 4:
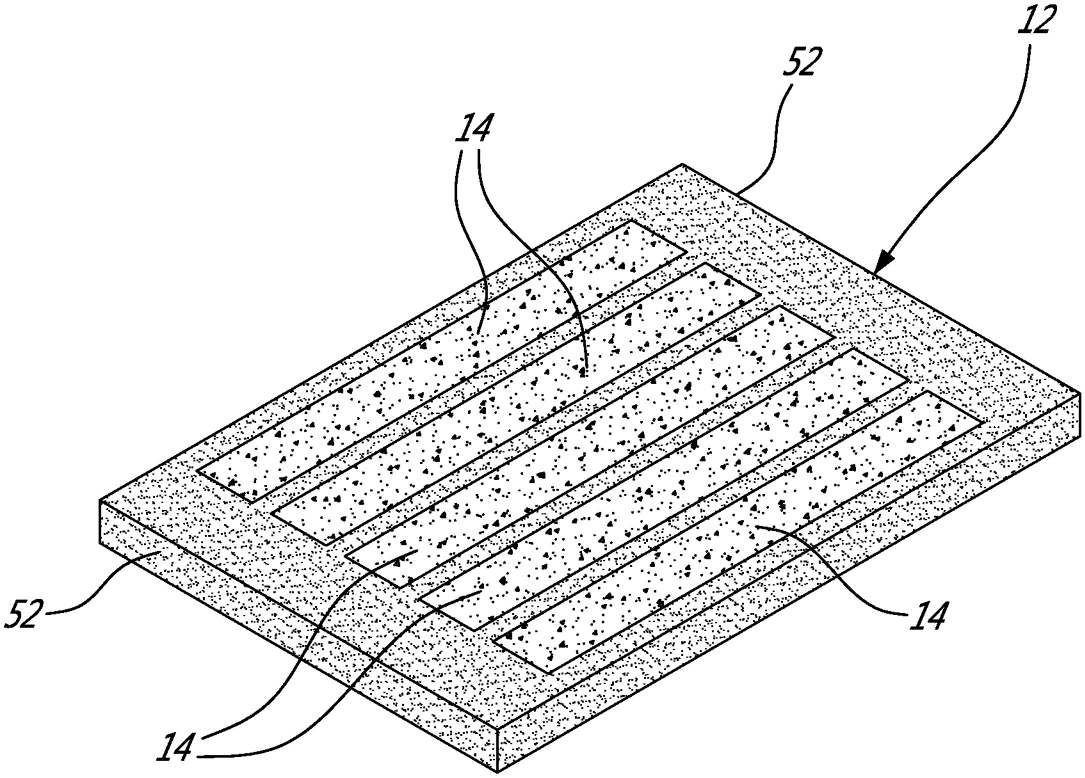
FIG. 4 is an isolated perspective view of the flexible mold shown in FIG. 1, including dried wet-cast concrete products therein.

One of the molds 12, prior to demolding, and therefore with dried wet-cast products 14 therein, is shown in FIG. 4.

The mold is made of rubber, polyurethane, or of another flexible material.

While the illustrated products are in the form of five (5) identical elongated bricks 14, the system 10 can be used for cracking a flexible mold including a various number of identical or of differently shaped products.

The system 10 is integrated to a conveyor 16 for the molds 12.

The conveyor 16 is a pusher bar conveyor that comprises a table defined by two elongated side plates 18 joined by a series of parallel transversal shafts 20, two pairs of legs 22, each secured to a respective plate 18 near the longitudinal ends 24 and 26 thereof, and a conveying surface, defined on a first third of the table by a series of parallel longitudinal frame elements 28-30 and by a rectangular support plate 32 that extends through the remaining surface of the table.

The conveyor 16 further comprises a product-conveying mechanism including pusher bars 34 that are mounted to the table for movement along a closed loop path around the table that passes in close proximity to the conveying surface.

The product-conveying mechanism includes i) two strands of roller chains 36 (shown schematically in FIG. 2 by dashed lines), each one mounted on a respective plate 18, on the inner side thereof, in a close loop fashion via a series of pulleys 38, ii) a drive shaft 40 mounted to both plates 18 therebetween and a iii) motor 42 operatively coupled to the drive shaft 40. Each roller chain 36 is coupled to the drive shaft 40 via a driving pulley 44.

The pusher bars 34 are secured to both strands of roller chains 36 therebetween via mounting brackets 46.

The table, the conveying surface and the product-conveying mechanism are not limited to the illustrated embodiment, and can be adapted, for example, to the configuration of the mold 12. Since pusher-bar conveyors are believed to be well-known in the art, the conveyor 16 will not be described herein in more detail.

According to another embodiment (not shown), the system 10 is integrated to another type of conveyor, such as, without limitations, a belt conveyor.

In addition to the table of the conveyor 16, the system 10 for cracking flexible molds 12 comprises a pair of support members 48 that maintain molds 12 unto the support plate 32 and a corresponding pair of mold-bending elements 50 that move both longitudinal edges 52 of the molds 12 away from the plate 32 while the molds 12 are maintained thereon.

Two independent pairs of a mold-bending element 50 with a corresponding support member 48 are provided and positioned on the conveyor 16 so as to independently and simultaneously bend both longitudinal edges 52 of the molds 12. According to another embodiment, a single pair of mold-bending element 50 and support member 48 is provided that cracks the molds 12 by bending their longitudinal edges 52 in consecutive passes therethrough or by bending a single one of the longitudinal edges 52, depending for example on the configuration and size of the molds 12 and/or of the products 14 therein.

Both the support member 48 and mold-bending element 50 are secured to the conveyor 16 via a pair of opposite mounting assemblies 54 that is secured to a respective side plate 18. Each mounting assembly 54 includes a shelf 56 secured to a respective plate 18 via triangular-shaped brackets 58 so as to extends laterally from the plate 18, and a vertical member 60 mounted to the shelf so as to extend upwardly therefrom.

The support member 48 is in the form of a cylindrical rod that is mounted to the vertical member 60 for pivotal movement about pivotal axis 64 via an actuating assembly 62. The axis 64 is parallel to both the plate 32 and the edges 52 of the molds 12 that are moved face down by the conveyor 16.

The actuating assembly 62 includes i) a cylindrical rod 66 that is pivotably mounted via rollers 68 to both vertical members 60 therebetween and ii) two (2) first levers 70 secured to the cylindrical rod 66, each near a respective longitudinal end 72 thereof. The support member 48 is mounted to both levers 70 therebetween, near the end thereof opposite the ends receiving the cylindrical rod 66, so as to be generally parallel to the rod 66.

The longitudinal ends of both rods 48 and 66 are operatively coupled to a cylinder actuator 74 via a second lever 76. The lever 76 is secured at one end to the rod 66 and at the other end to the cylinder 74. A bridge plate 78 further attached both levers 70 and 76 for solidary pivotal movement therebetween and so to add rigidity to the assembly.

A mechanical stop (not shown) can be provided to limit the movement of the support member 48, such as on the cylinder 74 to limit its stroke.

Figure 3A:
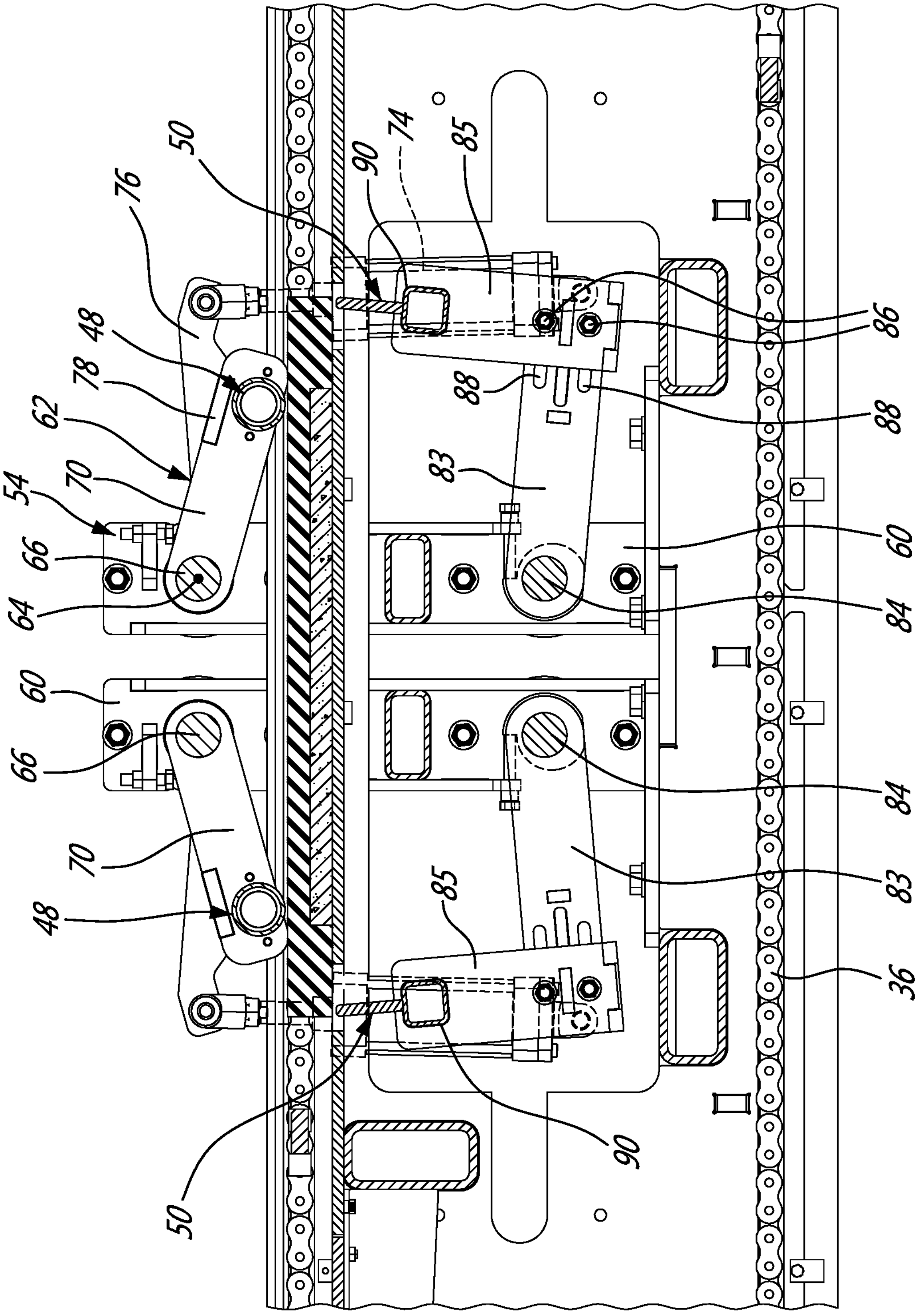
FIG. 3A is a close-up view of the mold-bending mechanism of the system from FIG. 1; the mold-bending mechanism being shown in its retracted position.
Figure 3B:
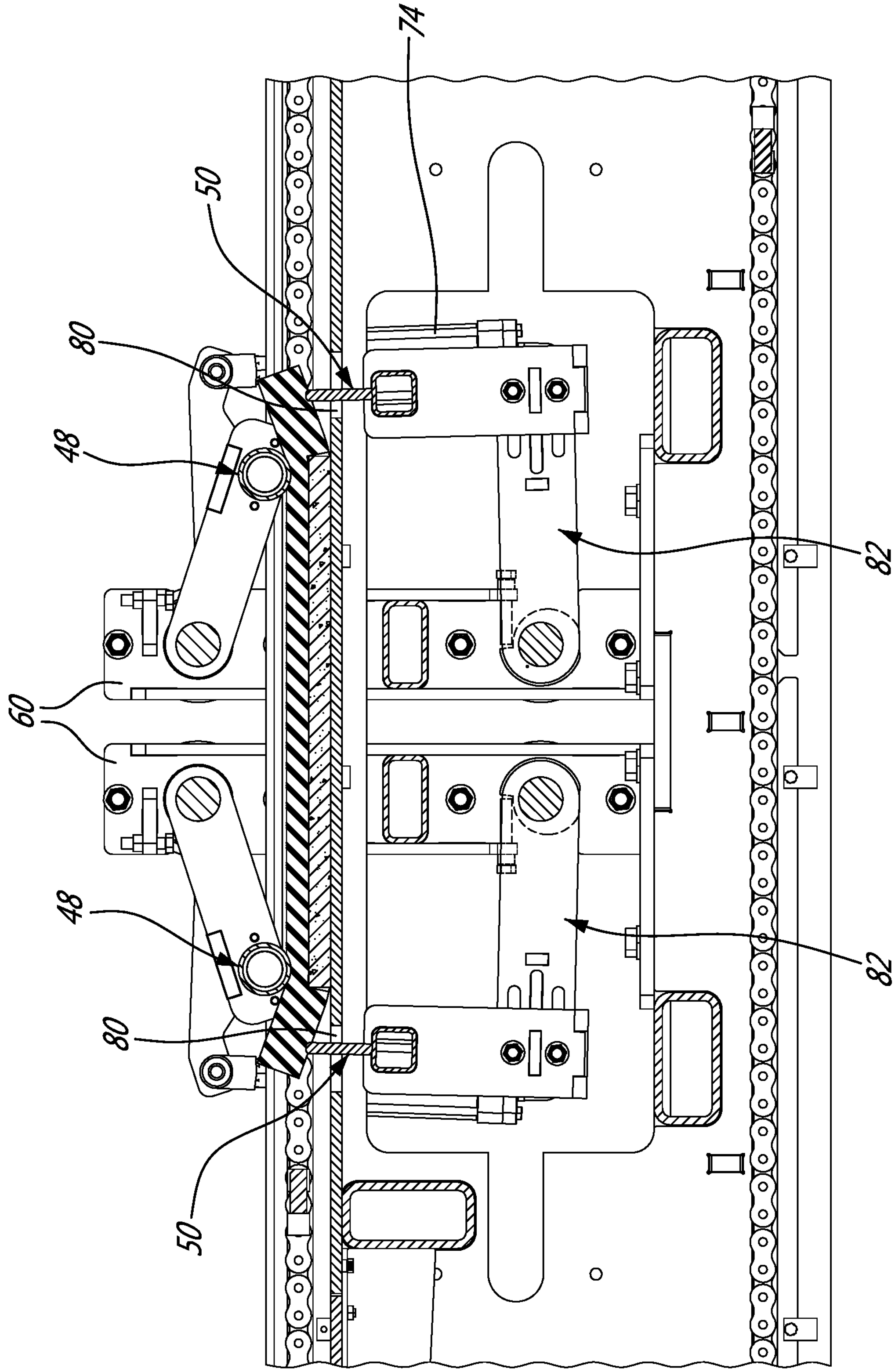
FIG. 3B is a close-up view similar to FIG. 3, showing the mold-bending mechanism in its mold-contacting position.

Turning now to FIGS. 3A-3B, the mold bending elements 50 are in the form of blades that are mounted to the actuating assemblies 62 for pivoting movement towards and away a mold-contacting position. Each of the four blades 50 is registered with a corresponding opening 80 in the plate 32 and has a length comparable, but slightly smaller, thereto so as to be movable in and out thereof. The openings 80 are positioned parallel to the axis 64 and are located so as to be registered with the longitudinal edges 52 of the molds 12.

Each blade 50 is pivotably mounted a pair of opposite actuating assemblies 62 via a L-shaped member 82. The blade 50, actuating assemblies 62 and L-shaped member 82 together form a mold-bending mechanism.

The member 82 comprises a first arm 83 that is pivotably mounted to two laterally opposite vertical member 60 via a rod 84 that is pivotably mounted thereto via rollers 68.

The L-shaped member 82 further includes a second arm 85 that is fixedly mounted to the first arm 83 using fasteners 86 so as to extend generally perpendicularly therefrom. For that purpose, the first arm 83 includes a pair of parallel slots 88 to receive the fasteners 86 therein and to further allow adjusting the longitudinal position and/or angle of the second arm 85 relative to the first arm 83.

According to another embodiment (not shown), the second arm 85 is secured to the first arm 83 so that their relative positions cannot be adjusted. According to still another embodiment, the second arm 85 is integral to the first arm 83. According to a further embodiment, another member than an L-shaped member is used to pivotably mount the blade 50 to the table of the conveyor 16.

Each pair of transversally aligned blades 50 are mounted to a corresponding pair of laterally opposite second arms 50 therebetween via a rectangular rod 90 that is secured thereto.

The L-shaped member 82 is mounted, at the intersection of both arms 83 and 85, to the end of the cylinder 74 opposite the second lever 76.

As will now become apparent to a person skilled in the art, the actuation of the cylinder 74 causes the simultaneous i) pivoting of the L-shaped member 82 so that the blades 50 are moved upwardly through the openings 80 and ii) movement of the support members 48 towards the plate 32 so as to maintain molds 12 thereon in close contact with the plate 32. It results from such movements that the longitudinal edges 52 of the molds 12 are moved upwardly away from the plate 32, while portions of the molds 12 that are longitudinally adjacent to the edges 52 are maintained onto the plate 32. This removes vacuum between the molds 12 and products 14 and therefore the adherence therebetween, thereby facilitating the removal of the products 14 during demolding.

The actuation of the cylinder 74 is synchronized with the passage of the molds 12 along the conveyor 16, the position of the molds 12 being indexed by the pusher bars 34. Depending on the products 14 or on the configuration of the molds 12, the system 10 can be operated so that the molds 12 are cracked while moving onto the conveyor 16 or while their movements are stopped.

According to another embodiment, the position of the molds 12 on the conveyor 16 is indexed using sensors (not shown) or switches (not shown).

It is to be noted that connectors, cables, and other secondary or non-mechanical components of the system 10 have been omitted in the figures so as to alleviate the views.

Figure 5:
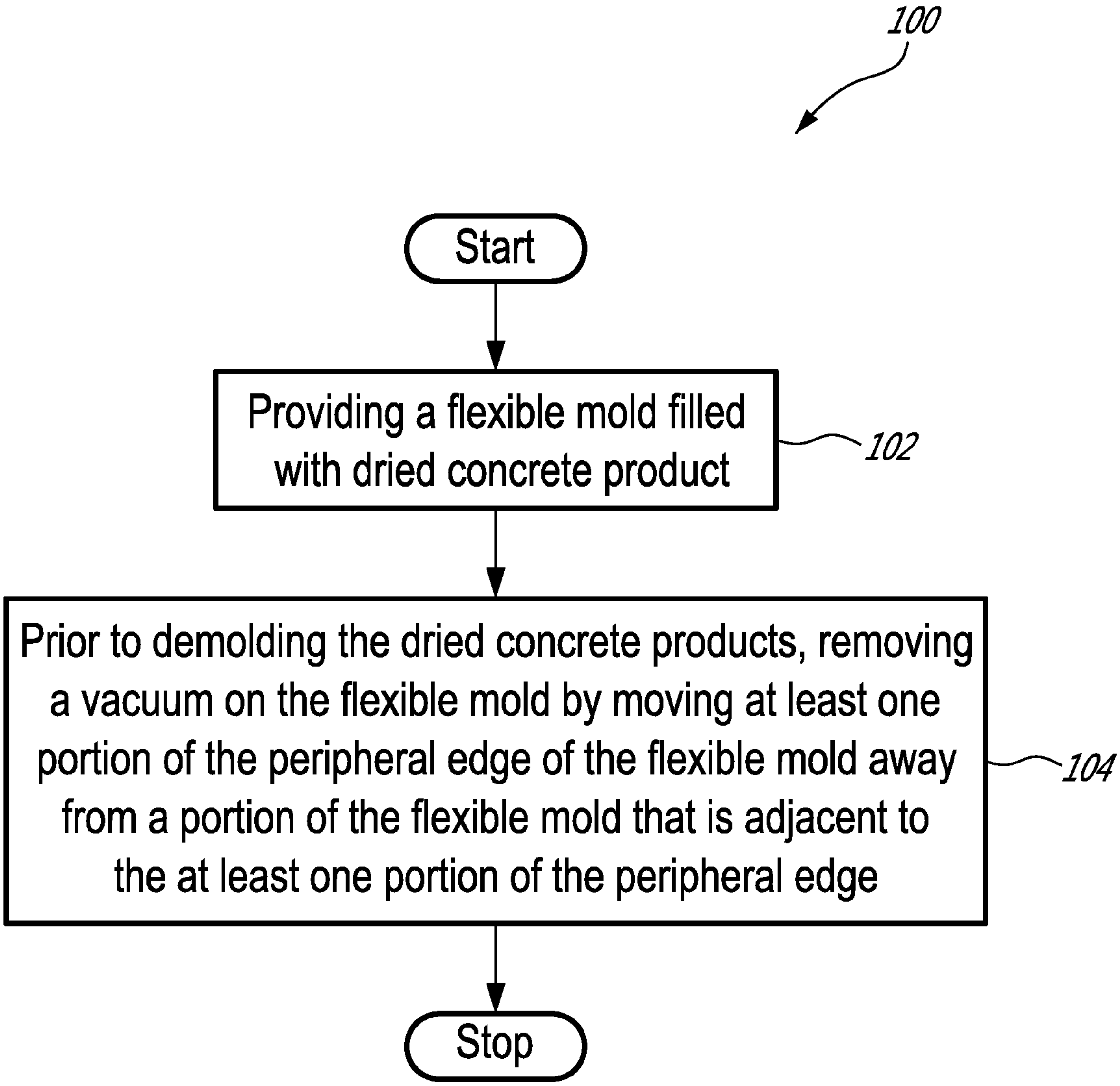
FIG. 5 is a flowchart of a method for cracking a flexible mold of dried wet-cast concrete products according to an illustrative embodiment.

The operation of the system 10 is summarized in FIG. 5.

It is to be noted that many modifications could be made to the method and system for cracking a flexible mold described hereinabove, for example:

- the method and system are not limited to cracking molds 12 at their longitudinal side edge; the system can be modified, including the orientation of the blades 50 and openings 80, so that the molds 12 are cracked alternatively or complementarily at their lateral sides;
- the blades 50 can be substituted with a plurality of fingers or plungers (not shown) and the elongated openings 80 can be replaced by a series of holes (not shown) in the plate 32;
- the support members 48 can take other form or be omitted. For example, the support member can be rectangular, triangular, L-shaped, etc.
- instead of members that pushes the edges 52 of the molds 12 upwardly, the mold-bending mechanism can be configured to move the edges 52 downwardly. For example, the mold-bending mechanism can be in the form of one or more grabbing members (not shown) that pull the edges 52 of the molds 12 downwardly while the edges 52 are positioned above an opening in the conveying surface;
- according to still another embodiment, the vacuum is removed by stretching the mold 12 longitudinally or laterally;
- the mold-bending mechanism can be adapted to bend the molds 12 while they are face up on the table;
- the mounting assemblies 54 are not limited to the illustrated embodiment and can take other forms allowing to secure both the support member 48 and mold-bending element 50 to the conveyor 16;
- the system 10 can be modified so as to include a different actuator for the mold-bending mechanism and support member 48 than the cylinder 74. Also, according to another embodiment, a different actuator is provided for each mold-bending mechanism and each support member;
- while the support members 48 are movable between deployed and retracted positions, they can be modified so as to be fixedly mounted to the conveyor 16.

Although a method and system for cracking a flexible mold of dried concrete products have been described hereinabove by way of illustrated embodiments thereof, they can be modified. It is therefore to be understood that numerous modifications may be made to the illustrative embodiments and that the scope of the claims should not be limited by the preferred embodiment but should be given the broadest interpretation consistent with the description as a whole.

What is claimed is:

1. A system for cracking at least one flexible mold of dried wet-cast concrete products, the system comprising:

- a table defining a surface for receiving the at least one flexible mold thereon; the table including at least one opening;
- at least one mold-bending member mounted to the table so as to be movable in and out of the at least one opening, respectively towards and away a mold-contacting position that forces an edge portion of the at least one flexible mold to move away from the surface; the at least one mold-bending member being mounted to the table under the surface thereof via a mounting member that includes i) a first arm that is pivotably mounted to the table, and ii) a second arm that receives the at least one mold-bending member;
- at least one mold-support member mounted to the table so as to be movable towards and away the table adjacent the at least one opening to prevent a portion of the at least one flexible mold that is adjacent the edge portion to move in a same direction than the edge portion when the at least one mold bending member is in the mold-contacting position and the at least one-mold support member is moved towards the table, adjacent the at least one opening; and
- an actuating mechanism, mounted to both the mounting member and to the at least one mold-support member, that is movable to cause the at least one mold-bending member to pivot towards and away the mold-contacting position simultaneously to moving the at least one mold-support member respectively towards and away the surface of the table.

2. The system as recited in claim 1, wherein the at least one mold-bending member includes a plurality of mold-bending members and the at least one mold-support member includes a plurality of mold-support members.

3. The system as recited in claim 1, wherein the at least one one-mold support member includes a rod for contacting onto the portion of the at least one flexible mold that is adjacent the edge portion when the at least one mold bending member is in the mold-contacting position.

4. The system as recited in claim 1, wherein the actuating mechanism includes a cylinder mounted to both the at least one mold-bending and mold-support members therebetween.

5. The system as recited in claim 1, further comprising a mechanical stop on the at least one mold-support member to limit movements thereof.

6. The system as recited in claim 1, wherein the at least one mold-bending member includes a blade.

7. The system as recited in claim 1, further comprising a conveyor; the table being part of the conveyor.

8. The system as recited in claim 3, wherein the rod is mounted to the table so as to be oriented along an axis that is parallel to the edge portion of the at least one flexible mold.

9. The system as recited in claim 7, wherein the conveyor is a pusher-bar type conveyor.

* * * * *